(12) United States Patent
Duprez

(10) Patent No.: US 7,955,679 B2
(45) Date of Patent: Jun. 7, 2011

(54) SYSTEM AND METHOD FOR PROTECTING A SURFACE AREA

(76) Inventor: Richard Duprez, American Canyon, CA (US)

(*) Notice: Subject to any disclaimer, the term of this patent is extended or adjusted under 35 U.S.C. 154(b) by 566 days.

(21) Appl. No.: 12/098,125

(22) Filed: Apr. 4, 2008

(65) Prior Publication Data

US 2009/0250965 A1   Oct. 8, 2009

(51) Int. Cl.
*B32B 3/02* (2006.01)
*B32B 3/10* (2006.01)
*B62D 25/20* (2006.01)

(52) U.S. Cl. ......... 428/43; 118/504; 118/505; 206/820; 428/80; 428/81; 428/83; 428/180; 428/906

(58) Field of Classification Search ........... 428/180, 428/43, 80, 81, 83, 906; 118/504, 505; 206/820
See application file for complete search history.

(56) References Cited

U.S. PATENT DOCUMENTS

| | | | |
|---|---|---|---|
| 5,042,656 A | 8/1991 | Kahre | |
| 5,489,459 A * | 2/1996 | Nauman | 428/43 |
| 5,626,933 A * | 5/1997 | Long | 428/52 |
| 5,846,016 A | 12/1998 | Martinez et al. | |
| 6,044,600 A * | 4/2000 | McCollough | 52/209 |
| 6,315,831 B1 | 11/2001 | Renetta | |
| D454,594 S | 3/2002 | Brozak, Jr. | |
| 6,911,407 B2 | 6/2005 | Sherrod et al. | |
| 2001/0002615 A1 | 6/2001 | Lacross | |
| 2003/0126826 A1* | 7/2003 | Marshall et al. | 52/718.01 |
| 2004/0050324 A1 | 3/2004 | Copp | |
| 2005/0058803 A1 | 3/2005 | Bowden | |
| 2005/0262781 A1 | 12/2005 | Hughes | |

FOREIGN PATENT DOCUMENTS

WO   WO 02/18064   3/2002

* cited by examiner

*Primary Examiner* — Brent T O'Hern
(74) *Attorney, Agent, or Firm* — Jafari Law Group, Inc.; David V. Jafari

(57) ABSTRACT

The invention is an impermeable floor cover for protecting a surface while working along door regions, which utilizes one or more cover components, designed to allow full door movement variability. The specialized cover is made with a light, flexible and durable fabric, which maintains a flat composure and is adapted to register with one or more door jambs to substantially cover a floor space. Each cover component includes multiple grooves adapted to register with a door's jambs for protecting a surface area from undesired exposure to substances such as paint.

27 Claims, 6 Drawing Sheets

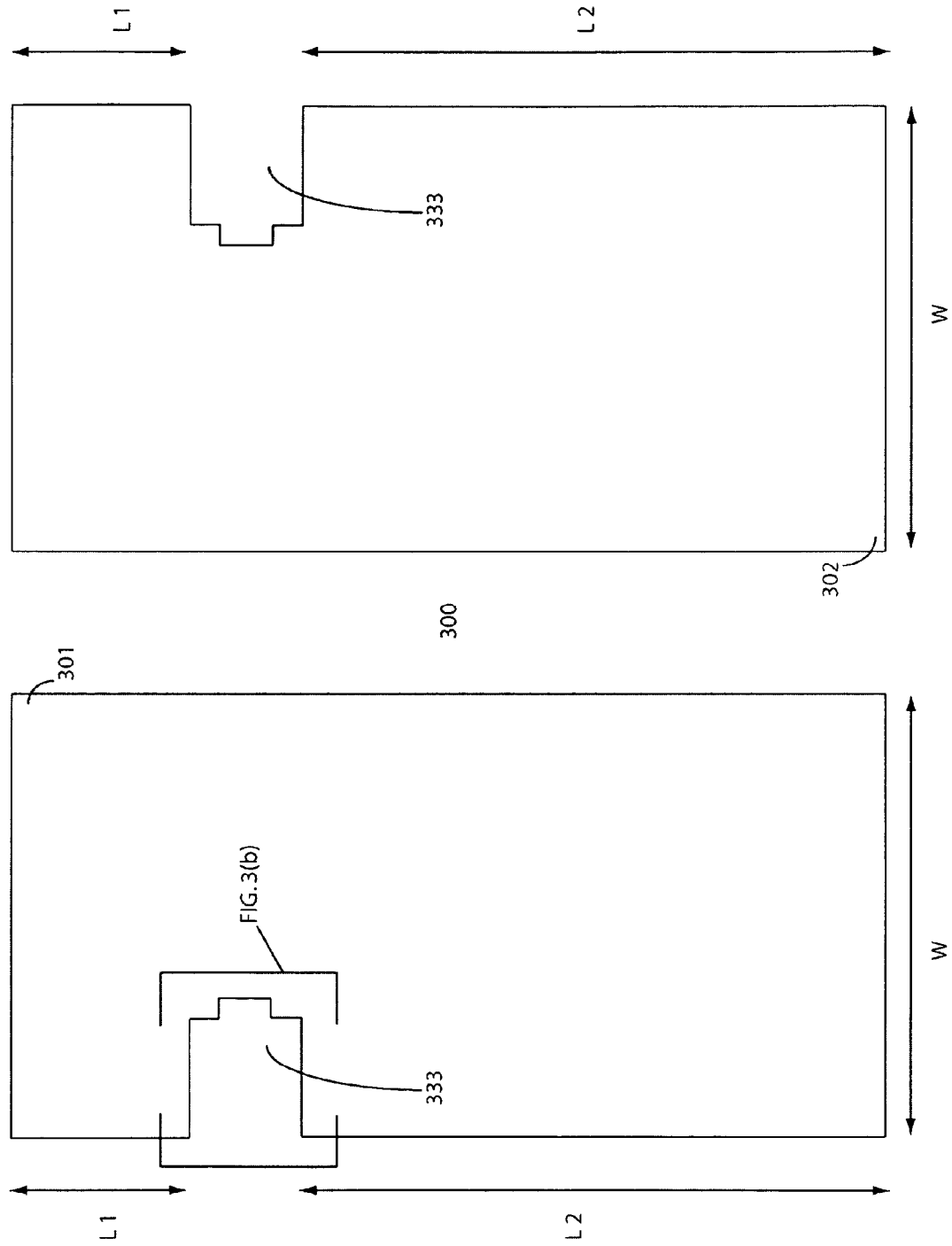

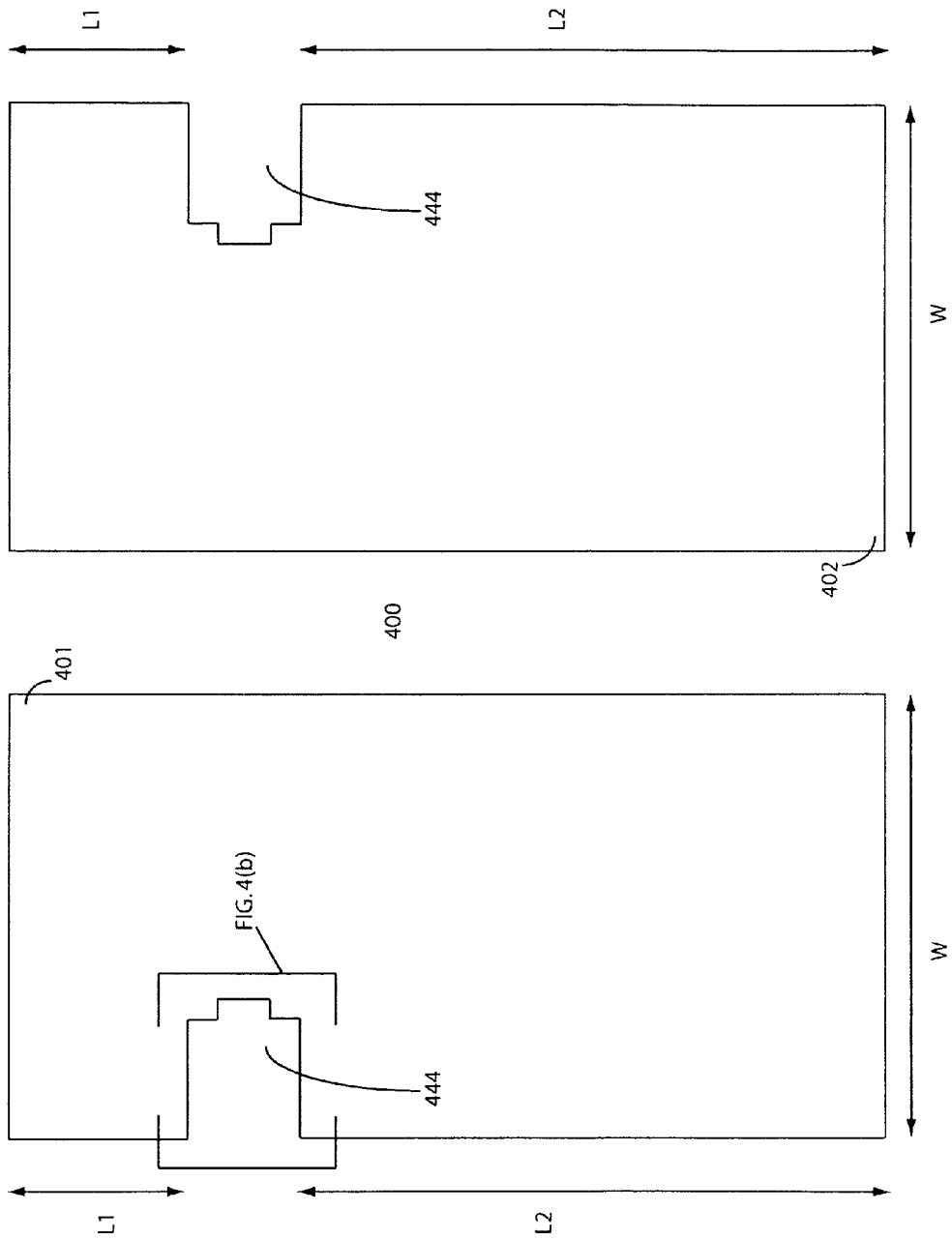

SYSTEM AND METHOD FOR PROTECTING A SURFACE AREA

TECHNICAL FIELD OF THE INVENTION

The present invention relates in general to a dual cover component impermeable floor cover utilized for protecting a surface while working along door regions, and more specifically, to utilizing one or more cover components designed to allow full door movement variability, which include multiple internal grooves adapted to register with a door jamb for protecting a surface area from undesired exposure to substances such as paint.

BACKGROUND OF THE INVENTION

Traditionally, various methods and apparatus have been implemented to prepare an area, such as a surface area, before performing any type of work that may collaterally damage a space otherwise intended to be preserved. These methods are employed during remodeling procedures, painting jobs, or any other type of task that may undesirably result in damaging, for example, a floor space.

In the context of painting for example, one of the most important aspects of preparing a room for painting is protecting or covering an area that is not intended to be painted. Perhaps the most difficult area to protect is the surface or floor area immediately between and around a door jamb, as well as, the floor area adjacent to and around a door. For decades, professional painters have attempted but struggled to implement various techniques to accomplish this task more efficiently and effectively.

Many traditional tools have sought to properly address this problem of adequately protecting floors or surfaces during such jobs; however these methods remain inefficient, time consuming, and therefore undesirable. For example, the traditional method of using materials, such as paper or plastic segments, and placing them on a floor surface for protection from paint, has proven to be time-consuming and inefficient. Furthermore, such materials are fragile in nature and usually too frail to withstand the reasonable volume of foot traffic, and consistent usage thereof, that is generated by a working personnel while executing a paint job.

Such products and methods, while seemingly simple and inexpensive actually require consistent re-adjustment, repair, or replacement of covering material while working on and around a floor surface area that is intended to be protected. Thus, to save the user time and money, more durable resources may be utilized to assure a particular surface area remains protected and preserved during a paint job.

Another widely used method for protecting the floor area around a door area is using a standard or customary drop-cloth. However, the dimensions of these standard coverings and method of placing thereof carries many limitations. Thus, in order to provide adequate coverage between door jambs there must be a larger drop-cloth piece that must be folded into a rectangle shape to efficiently fit between opposing door jambs. This method proves to be ineffective and inadequate because floor areas directly below the door jambs remain unprotected.

Due to improperly dimensioned drop cloths, door jamb spaces may remain un-covered and otherwise unprotected thereby requiring additional materials, such as tape, to adequately protect the given area. Furthermore, after an extended period of time to accomplish this desired coverage, workers are usually left with multiple layers of cloth with paper and tape on top, which may be intrusive and disruptive to door movement and subsequently creating more undesired problems.

Complications to cover exposed areas often causes floor covering to develop a bubbly texture on its covering surface, thus making floor space susceptible to damage from unwanted exposure to leaking paint droplets. Users are unable to utilize full door potential or in extreme cases the door must be removed from its hinges; thus resulting in additional time wasted to compensate for defects in the floor covering.

In other instances, a door that hangs from hinges on its jamb may not swing on its hinges without catching on or causing a bunching up of the drop-cloth due to an inadequate space between the bottom of the door and the finish flooring. Workers find unevenly bunched-up sections as undesirable obstacles that may obstruct their workspace; such drop-cloths are not capable of preserving a consistent flat design for adequate floor covering of door jambs and space.

Other covers are improperly dimensioned due to design limitations, which do not consider adequate coverage of door jamb and door area as requisites for providing covering. Again, users compensate by forcing these covers to fit a limited area and use tape to cover floor areas that are otherwise left exposed and susceptible to paint.

Another problem with present practices is the materials used to protect surfaces from undesirable substance spills. Some covers are made of disposable materials, which are often impractical since constant replacements are required before use, creating unnecessary waste and constant re-supplying of resources.

Other floor coverings, which are not disposable, are constructed of paint impermeable materials typically assembled with a canvas-material. Canvas is heavy in nature and thick. If opening or closing a door, the protective cover is usually caught and bunched up by the door due to inadequate spacing left between the cover and the door. This inadequate spacing requires some doors to be left closed for proper painting, thus, all the equipment needed to accomplish a painting task must be brought into a room prior to painting because the only way to properly provide coverage to an entire floor area is to leave the door closed-often requiring tools and workers to stay in the room. This is inefficient and inconvenient, thus covers manufactured from thick (usually heavy) materials such as canvas, which do not allow door functionality, are undesirable.

Therefore, there is a need in the art for a system and method of protecting a surface that does not require constant handling during preparation; constant replacement with each use; properly protects vulnerable spaces often left open and exposed to unwanted substance spills; is cost effective; and efficient to implement when preparing a surface for performing improvement work, such as painting around a door area. It is to these ends that the present invention has been developed.

SUMMARY OF THE INVENTION

To minimize the limitations found in the prior art, and to minimize other limitations that will be apparent upon the reading of the specification, the present invention provides an impermeable floor cover for protecting a surface while working along door regions, which utilizes one or more cover components designed to allow full door movement variability and include multiple internal grooves adapted to register with a door's jambs for protecting a surface area from undesired exposure to substances such as paint.

A specialized floor cover is described herein with an improved paint impermeable multi-cover component design, which maintains a flat composure and is adapted to register with one or more door jambs to substantially cover a floor space.

A drop cloth or floor cover, in accordance with the present invention, comprises a first cover member including a first groove adapted to register with a first door jamb of a door, and a second cover member including a second groove adapted to register with a second door jamb of said door.

Another cover, in accordance with the present invention, comprises a first cover member including a first groove adapted to register with a first door jamb of a door, wherein said first cover member further comprises a material substantially non-permeable to paint, and wherein said first cover member is also adapted to overlap with a second cover member including a second groove adapted to register with a second door jamb of said door.

One method of protecting a surface utilizing a floor cover, in accordance with the present invention, comprises the steps of placing a first floor cover including a first groove on a floor such that the first groove registers with a first door jamb of a door, placing a second floor cover including a second groove on the floor such that the second groove registers with a second door jamb of the door, and positioning said first and second floor covers so that a portion of said second floor cover overlaps with said first floor cover, wherein said first and second floor covers include a material based on a PVC-rubber coating.

It is an objective of the present invention to provide a surface area around a door space with protection from undesirable substance spills during improvement work performed on premises.

It is another objective of the present invention to provide a surface cover such as a floor cover that is durable and sturdy to allow easy handling during surface preparation.

It is yet another objective of the present invention to maximize work efficiency by minimizing surface preparation time before performing work around a door floor area.

It is yet another objective of the present invention to provide a floor cover that does not obstruct door movement during an improvement job around a door floor area.

It is yet another objective of the present invention to provide a floor cover constructed of a thin, flexible, yet sturdy material.

It is yet another objective of the present invention to provide a floor cover which includes multiple components to make it adaptable for protecting a variety of door spaces.

It is yet another objective of the present invention to provide a floor cover adequate for use in residential and commercial applications.

Finally, it is yet another objective of the present invention to provide a specialized floor cover with an improved paint impermeable multi-cover component design, which maintains a flat composure and is adapted to register with one or more door jambs to substantially cover a floor space.

These and other advantages and features of the present invention are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 3(a) illustrates a top view of a floor cover, in accordance with an exemplary embodiment of the present invention, which has been adapted to register with door jambs typically used with residential doors.

FIG. 4(a) illustrates a top view of a floor cover, in accordance with an exemplary embodiment of the present invention, which has been adapted to register with door jambs typically used with commercial doors.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Figure 1:
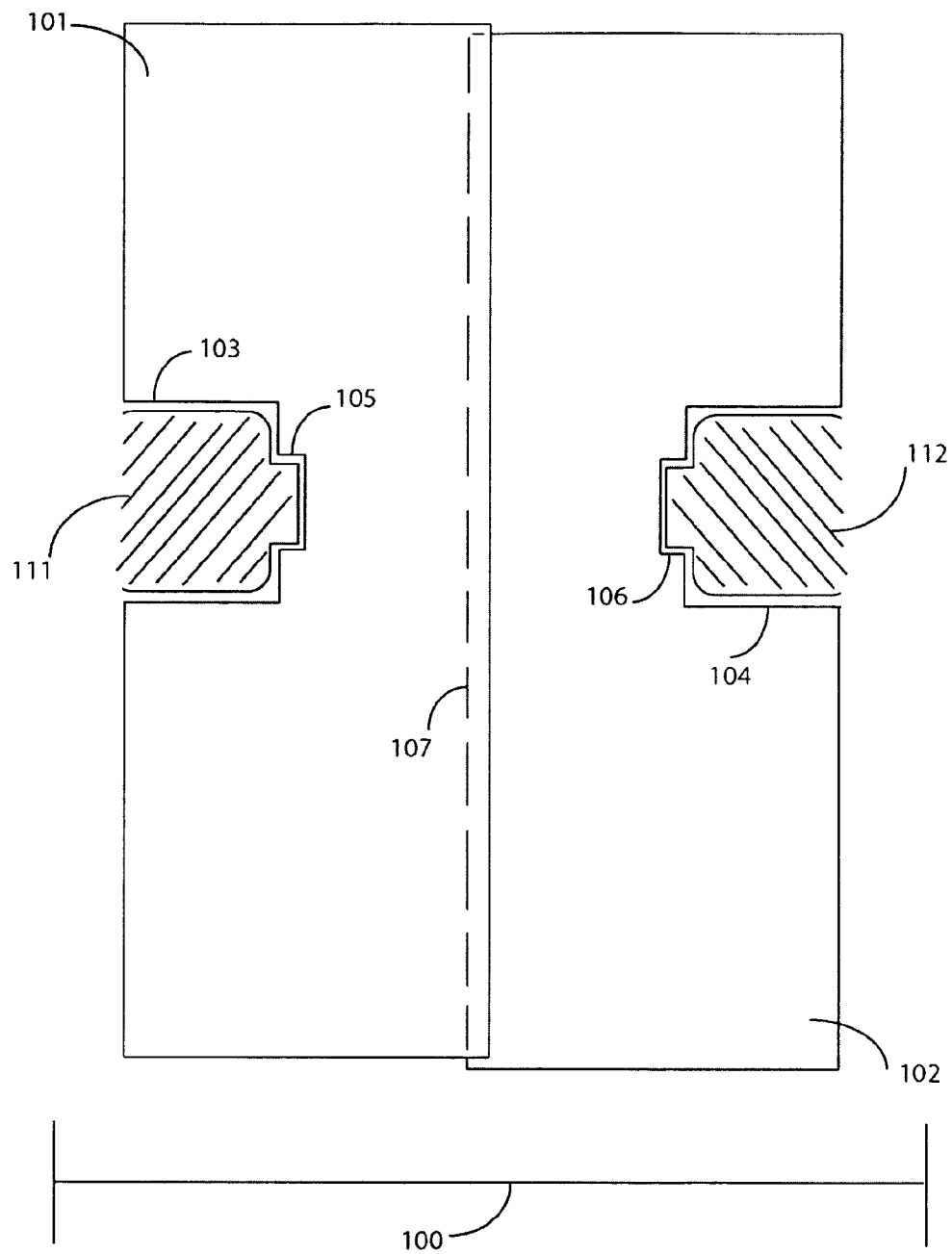
FIG. 1 illustrates a top view of one embodiment of the present invention, wherein two components of a floor cover overlap to protect the surface space between two jambs of a residential door.

FIG. 1 illustrates a top view of one embodiment of the present invention, wherein two components of a floor cover overlap to protect the surface space between two jambs of a residential door.

In the illustrated embodiment, cover 100 comprises cover component 101 and cover component 102, which have been configured to interact by overlapping at section 107. Cover components 101 and 102 are configured with a cut-out space, or groove, which has been manufactured into their material or fabric to properly fit around or register with a jamb of a door, for example door jambs 111 and 112.

Thus, in order to properly cover any floor space between cover component 101 and door jamb 111, cover component 101 has been adapted to include a first primary groove 103 designed to fit around a wider area of a door jamb 111, and a first internal secondary groove 105 designed to fit a smaller area of a jamb 111 (i.e. a protrusion that extends from a wider area of door jamb 111).

Similarly, cover component 102 has been adapted to include a second primary groove 104 designed to fit around a wider area of a door jamb 112, and a second internal secondary groove 106, designed to fit a smaller area of a jamb 112 (i.e. a protrusion that extends from a wider area of door jamb 112).

Cover components 101 and 102 may comprise of any impermeable material without deviating from the scope of the present invention. In one embodiment, cover components 101 and 102 are made of a polyester material. In another embodiment, cover components 101 and 102 are made from a cotton material.

In an exemplary embodiment, cover components 101 and 102 are constructed of a flexible, smooth material, which includes a PVC-based rubber coating that expresses impermeability to paint yet remains thin and lightweight. This coating may be desirable because it offers a rubber base to components 101 and 102 that allows cover 100 to stick to the ground, thus tolerating foot traffic. This prevents cover 100 from slipping around, from bulging up, or from creating a bubbling effect that may hinder a door movement, for example a door coupled to door jambs 111 and 112.

Figure 2:
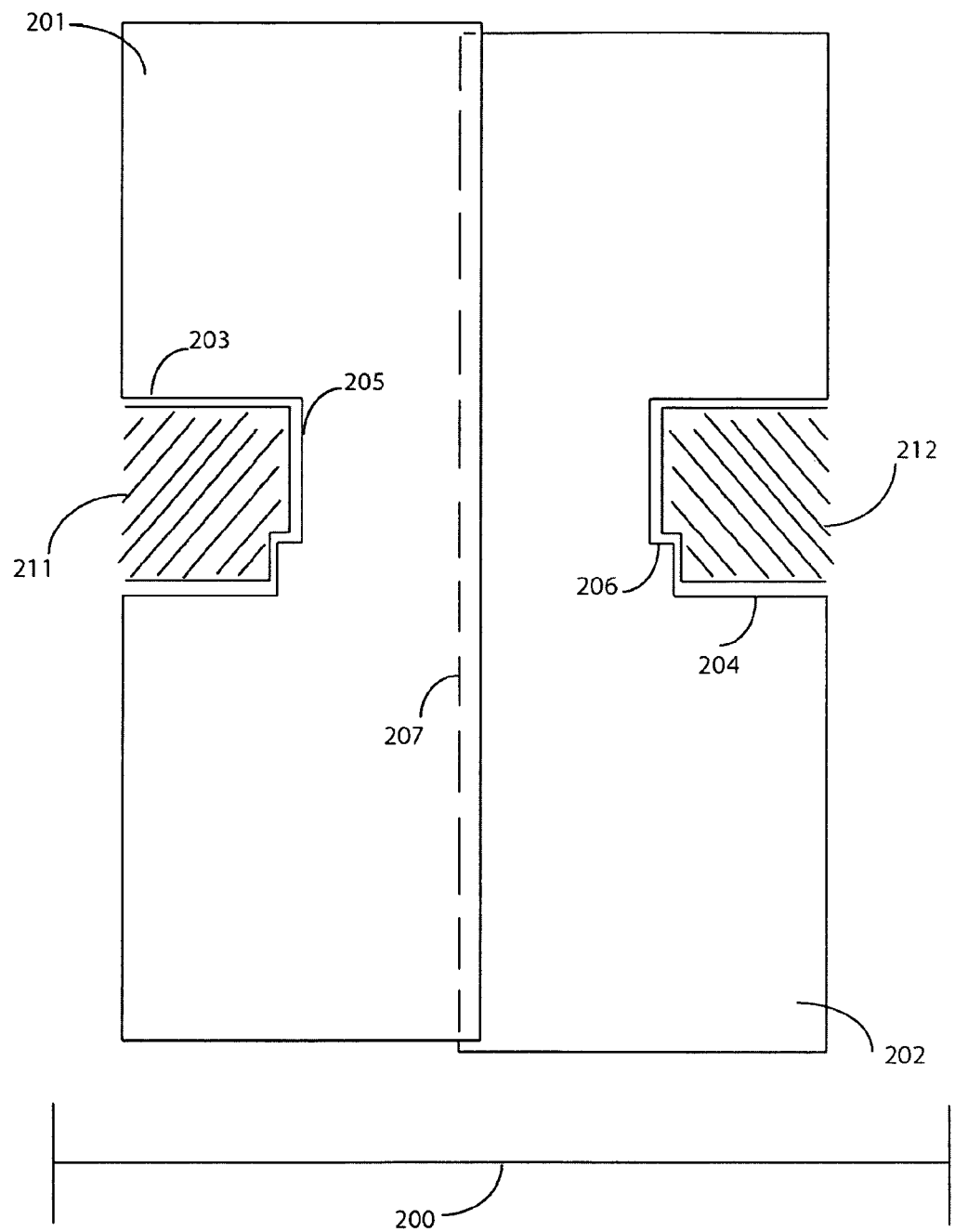
FIG. 2 illustrates a top view of one embodiment of the present invention, wherein two components of a floor cover overlap to protect the surface space between two jambs of a commercial door.

FIG. 2 illustrates a top view of one embodiment of the present invention, wherein two components of a floor cover overlap to protect the surface space between two jambs of a commercial door.

Cover 200 comprises cover component 201 and cover component 202, which have been configured to interact by overlapping at section 207. Like cover 100, cover 200's cover components 201 and 202 are configured with a cut-out space, or groove, which has been manufactured into their material or fabric to properly fit around or register with a door, for example door jambs 211 and 212, which are door jambs typically used in commercial applications such as factories, warehouses, industrial buildings, etc.

Like cover 100, cover 200 has been configured with cover components 201 and 202 in a manner so that each includes specialized grooves to match or register door jamb 211's and 212's protruding shape. In the present invention, cover component 201 includes a first primary groove 203 designed to fit around a wider area of door jamb 211, and a first internal secondary groove 205 designed to fit a smaller area of jamb 211 (i.e. a protrusion that extends from a wider area of door jamb 211) in order to properly cover any floor space between cover component 201 and door jamb 211.

Similarly, cover component 202 has been adapted to include a second primary groove 204 designed to fit around a wider area of door jamb 212, and a second internal secondary groove 206, designed to fit a smaller area of jamb 211 (i.e. a protrusion that extends from a wider area of door jamb 212).

Covers components 101, 102, 201 and 202 may comprise of any impermeable material without deviating from the scope of the present invention. In one embodiment, cover components 101, 102, 201 and 202 are made of a polyester material. In another embodiment, cover components 101, 102, 201 and 202 are made from a cotton material.

Cover components 101, 102, 201 and 202 may be constructed of a flexible, smooth material, which includes a PVC-based rubber coating that expresses impermeability to paint yet remains thin and lightweight.

For example, and without deviating from the scope of the present invention, covers 100 and 200 are manufactured in a fabric that is thin enough to allow the full functioning of the door that passes above them and providing passage from room to room during the painting process, enabling the user to actually move the door while painting or performing any task that might require the movement of the door.

Furthermore, covers 100 and 200 should be manufactured from materials that allow covers 100 and 200 to be durable and reusable. In one embodiment, all edges may be hemmed and lock-stitched for added strength. The cut-out hemmed areas (i.e. displace regions, or first and second grooves described above) may comprise additional stitch reinforcement. This may be desirable since this will be an area of added wear considering that tape may be continuously applied and removed between different uses.

In an exemplary embodiment, covers 100 and 200 are manufactured from 80% polyester-20% cotton fabric that is coated on one side with PVC based rubber. This combination of material provides a floor cover that is impermeable to paints, solvents or any other spillage that may occur. It also provides a very thin product that will fit easily between the finish flooring and the bottom of the door and lies completely flat on any type of finish flooring (e.g. hardwood, tile, concrete, carpet, etc.).

Furthermore, such embodiment may be desirable to avoid trapped dust and particulate matter often collected by other fabrics such as canvas-based drop-cloths. Preventing collection of these undesirable particles is desirable because such matter is usually subsequently transferred to the finished product; thus, a cover in accordance with the present invention is also typically made of a tightly woven, "smoother" fabric that can be easily swept clean or otherwise made dust free before the application of finish coats of paint or other substances is applied to a working area near a doorway.

The above mentioned fabric composition is also desirable because it offers a rubber base to cover components 101, 102, 201 and 202 that allows each component to stick to the ground, thus tolerating foot traffic. This may be desirable because it prevents covers 100 and 200 from slipping around, from bulging up, or from creating a bubbling effect that may hinder a door movement, for example a residential door coupled to door jambs 111 and 112, or a commercial door coupled to door jambs 211 and 212.

In the illustrated embodiments shown either in FIG. 1 or FIG. 2, their respective cut-outs or grooves are centrally located with respect to each cover component 101, 102, 201, and 202. However, each cover component's grooves or cut-outs may be placed anywhere without deviating from the scope of the present invention. For example, turning to FIG. 3(a)-FIG. 4(b), embodiments are disclosed wherein each cut-out, groove, or displace region adapted to register with a door's jamb, is placed off-center with respect to each cover component.

FIG. 3(a) illustrates a top view of a floor cover, in accordance with an exemplary embodiment of the present invention, which has been adapted to register with door jambs typically used with residential doors.

Cover 300 is typically designed to fit around opposing door jambs and extend out to one side of the jamb further in distance than the other to provide the floor coverage beneath the door hung (i.e. on door hinges) perpendicular to the jamb.

Cover 300 comprises cover component 301 and cover component 302, and is designed in two pieces for adjustability purposes. Both pieces may be used independently, or may be used to constitute one single floor covering unit. Accordingly, FIG. 3(a) depicts exemplary dimensions of individualized corresponding cover components 301 and 302, each component comprising a displace region 333, which is located off-centered in relation to a total length of each cover component.

Figure 3B:
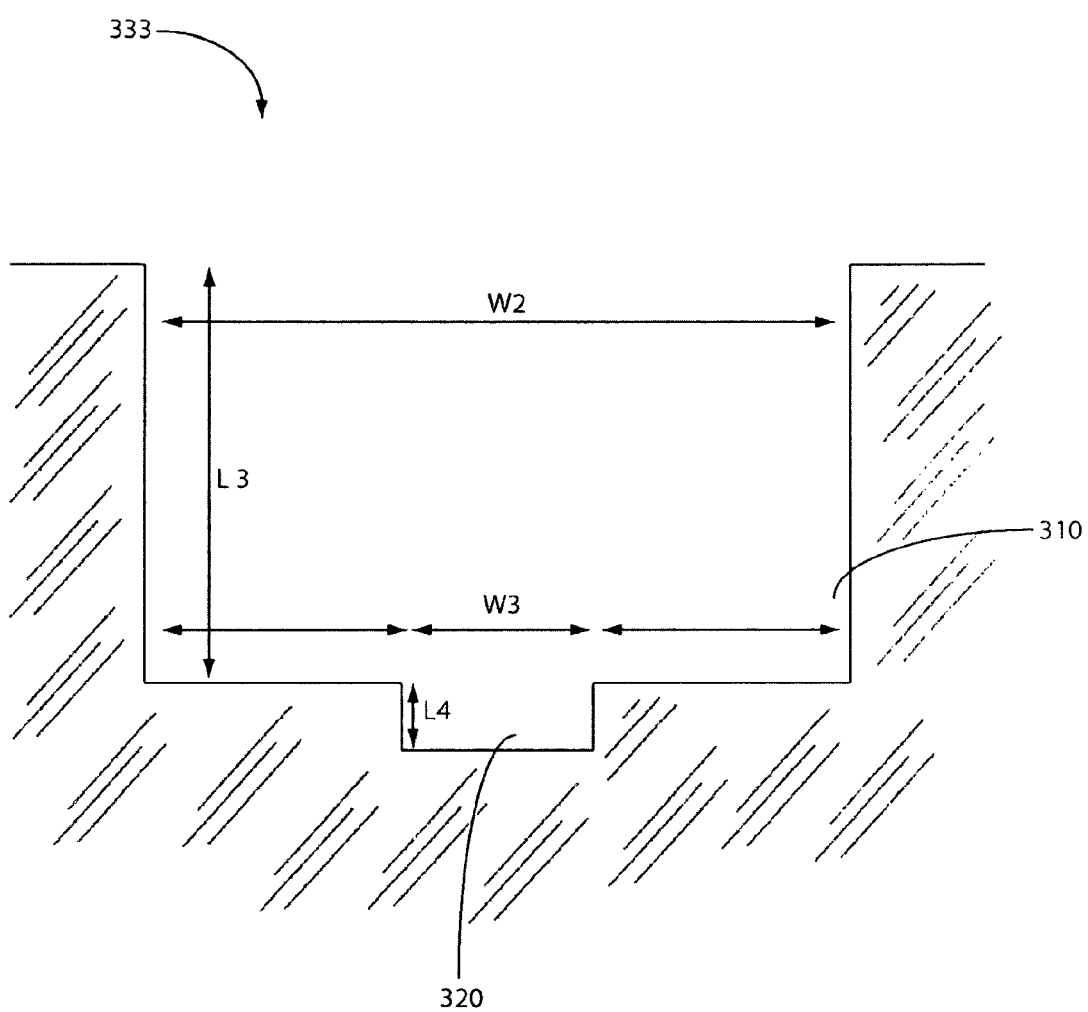
FIG. 3(b) illustrates a close up view of a floor cover's specialized groove, according to an exemplary embodiment of the present invention, which has been adapted to register with one type of door jamb typically used in residential applications.

Cover components 301 and 302 encompass a width W1 and vertical lengths L2 and L1 collectively, which are naturally relatively larger than a length of displace region 333 since the additional space is required to cover a surface around a doorway. In an exemplary embodiment, longer length L2 covers an inner doorway region and length L1 covers an outer door region, although different configurations would not deviate from the scope of the present invention. FIG. 3(b) is a closer look at displace region 333, which is a cut-out or groove designed to match the shape of a door jamb; in this case a residential door jamb.

FIG. 3(b) illustrates a close up view of floor cover 300's specialized groove, or displacement region 333, according to an exemplary embodiment of the present invention, which has been adapted to register with one type of door jamb typically used in residential applications. Displace region 333 may be constructed by implementing a first groove 310 and internal groove 320, wherein the first groove 310 comprises a width W2 and length L3; and internal groove 320 consists of a comprehensive width distribution of width W2 or width W3. In the present embodiment, internal groove 320 is substantially centrally situated to match-up or register with the shape of a residential door jamb, and has a substantially shorter length L4 so that a protrusion of a residential door jamb may be able to fit in said internal groove 320.

Turning to the next figure, FIG. 4(a) illustrates a top view of a floor cover, in accordance with an exemplary embodiment of the present invention, which has been adapted to register with door jambs typically used with commercial doors.

Like cover 300, cover 400 is typically designed to fit around opposing commercial door jambs and extend out to one side of the jamb further in distance than the other to provide the floor coverage beneath the door hung (i.e. on its hinges) perpendicular to the jamb.

Cover 400 comprises cover component 401 and cover component 402, and is designed in two pieces for adjustability purposes. Again, both pieces may be used independently, or may be used to constitute one single floor covering unit. Accordingly, FIG. 4(a) depicts exemplary dimensions of individualized corresponding cover components 401 and 402, each component comprising a displace region 444, which is located off-centered in relation to a length of each cover component.

Figure 4B:
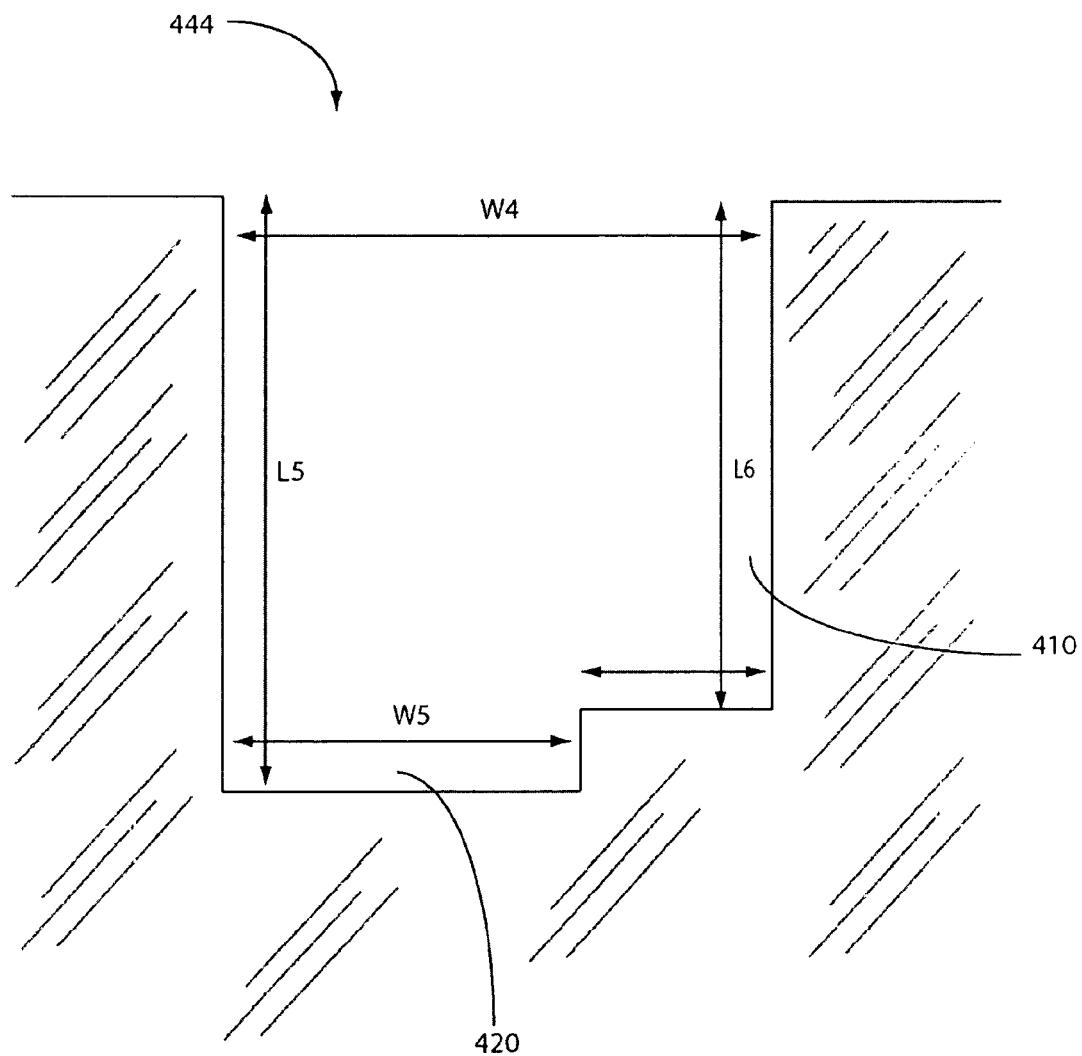
FIG. 4(b) illustrates a close up view of a floor cover's specialized groove, according to an exemplary embodiment of the present invention, which has been adapted to register with one type of door jamb typically used in commercial applications.

Cover components 401 and 402 encompass width W and vertical lengths L2 and L1 collectively, which are naturally relatively larger than a length of displace region 300 since the additional space is required to cover a surface around a doorway. Longer length L2 covers an inner doorway region and length L1 covers an outer door region. FIG. 4(b) is a closer look at displace region 444, which is a cut-out or groove designed to match the shape of a door jamb; in this embodiment, a commercial door jamb.

FIG. 4(b) illustrates a close up view of floor cover 400's specialized groove, according to an exemplary embodiment of the present invention, which has been adapted to register with one type of door jamb typically used in commercial applications.

Like the grooves in cover components 301 and 302 of cover 300, the grooves in cover components 401 and 402 have internal grooves. These grooves make up a displace region, here displace region 444, and will be discussed in turn.

Since displace region 444 is adapted to match or register with a commercial door jamb, it comprises an internal groove 420 that is off-centered from a width W4 of groove 410, thereby having a smaller width W5. Displace region 444 is therefore not symmetrical and comprises a length L5 and a shorter length L6.

In the present disclosure, various widths and lengths have been discussed, however it is understood that the various widths and lengths may vary depending on the application without deviating from the scope of the present invention.

In an exemplary embodiment, cover 300 and cover 400 provide coverage ranging from 20"-50." This range of variable coverage may be desirable to adequately encompass the vast majority of door opening sizes to be found in both residential and commercial applications. Furthermore, implementing various standardized lengths and widths may circumvent the need to manufacture more than one size for each individual cover components 301, 401, 302, and 402; thereby eliminating the need of a user to have to own more than one size of a particular cover in accordance with the present invention.

In one embodiment, displace regions 333 and 444 (i.e. respective cut-out areas of covers 300 and 400) allow covers 300 and 400, respectively, to fit entirely flat on the finish floor between opposing jambs with two extensions of fabric on each piece (i.e. cover components 301, 302, 401, and 402, respectively) extending between 5"-10" around and below the trim face on both sides of the door jamb.

While a variety of sizes may be used with a cover in accordance with the present invention, a length and width which addresses other needs may too be desirable; a typical size floor cover may occupy a huge amount of space both in a shop area and work vehicles. Therefore, it may be desirable to implement lengths and widths that allow a cover in accordance with the present invention to fold up neatly into a small size. This may particularly be plausible when utilizing a thin rubber-based fabric as described above.

In an exemplary embodiment, covers 300 and 400 each fold to a 9" wide×12" long×1" high area (i.e. not much bigger than a folded pillowcase). This is desirable to achieve a compact size to offer a user the convenience of carrying covers 300 and 400 in a tool box or container, thus transportability is facilitated.

A surface cover, or floor cover, in accordance with the present invention, also facilitates flexibility in the cover's applications due to its dual component design (e.g. cover components 301, and 302, or cover components 401 and 402), which allow a cover (e.g. cover 300 or cover 400) to be easily installed in the surface area of any doorway in a manner so that a user may easily affix one or more components to the desired surface area; this may be accomplished either by tape or any other practical means.

For example, and without deviating from the scope of the present invention, cover components 401 and 402 may be overlapped sufficiently to obtain the correct door opening size, and the overlapping edge may be taped to the underlying section to produce full coverage of the area described. Alternatively, any other method of securing a floor cover, such as a cover described in the present disclosure, may be employed without deviating from the scope of the present invention.

Additionally, it may be desirable to not only affix cover components 401 and 402 together, but also affix each component to the surface itself. For example, and without deviating from the scope of the present invention, displace region 444 of cover 400, which wraps the bottom of a door jamb when securely placed on a surface, may either have one or more rows of tape applied to the surface, or floor sought to protect, below each cover component 401 and 402 before installation.

Alternatively, tape may be applied on top of cover 400 to secure cover components 401 and 402 to the floor. Either method will provide complete coverage of finish flooring in an expedited manner. Again, other known methods may be used to secure cover components 401 or 402, without deviating from the scope of the present invention.

A dual-cover component impermeable floor cover utilized for protecting a surface while working along door regions has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching. It is intended that the scope of the invention not be limited by this detailed description, but by the claims and the equivalents to the claims.

What is claimed is:

1. A flexible floor cover that is capable of being folded-up and usable for protecting a surface that is not intended to be painted during painting, comprising:
    a first cover member including a first primary groove, and a first secondary groove situated within the first primary groove, wherein the first primary and secondary grooves are configured to register with a first door jamb of a door; and
    a second cover member including a second primary groove, and a second secondary groove situated within the second primary groove, wherein the second primary and secondary grooves are configured to register with a second door jamb of the door.

2. The cover of claim 1, wherein said first and second cover members overlap with each other.

3. The cover of claim 1, wherein said first primary groove includes the first secondary groove configured to register with a first protrusion of the first door jamb.

4. The cover of claim 3, wherein said second primary groove includes the second secondary groove configured to register with a second protrusion of the second door jamb.

5. The cover of claim 3, wherein said first secondary groove is substantially centrally situated within the first primary groove.

6. The cover of claim 3, wherein said first secondary groove is situated off-center within the first primary groove.

7. The cover of claim 4, wherein said second secondary groove is substantially centrally situated within the second primary groove.

8. The cover of claim 4, wherein said second secondary groove is situated off-center within the second primary groove.

9. The cover of claim 1, wherein said first and second cover members include a material substantially non-permeable to paint.

10. The cover of claim 1, wherein said first and second cover members include a material based on a polyvinyl chloride-rubber coating.

11. A flexible floor cover that is capable of being folded-up and usable for protecting a surface that is not intended to be painted during painting, comprising:
    a first cover member including a first primary groove, and a first secondary groove situated within the first primary groove, wherein the first primary and secondary grooves are configured to register with a first door jamb of a door, wherein:
    said first cover member further comprises a material substantially non-permeable to paint, and
    said first cover member is configured to overlap with a second cover member,
    wherein the second cover member includes a second primary groove, and a second secondary groove situated within the second primary groove, wherein the second primary and secondary grooves are configured to register with a second door jamb of said door.

12. The cover of claim 11, wherein said cover members include a material based on a polyvinyl chloride-rubber coating.

13. The cover of claim 11, wherein said first primary groove includes the first secondary groove configured to register with a first protrusion of the first door jamb.

14. The cover of claim 11, wherein said second primary groove includes the second secondary groove configured to register with a second protrusion of the second door jamb.

15. The cover of claim 13, wherein said first secondary groove is substantially centrally situated within the first primary groove.

16. The cover of claim 13, wherein said first secondary groove is situated off-center within the first primary groove.

17. The cover of claim 14, wherein said second secondary groove is substantially centrally situated within the second primary groove.

18. The cover of claim 14, wherein said second secondary groove is situated off-center within the second primary groove.

19. A flexible floor cover that is capable of being folded-up and usable for protecting a surface that is not intended to be painted during painting, comprising:
    a first cover member including a first primary groove, wherein the first primary groove is configured to register with a first door jamb of a door, said first primary groove having a first secondary groove substantially centrally situated within said first primary groove and shaped so as to register with a first protrusion of said first door jamb, wherein:
    said first cover member further comprises a material based on a polyvinyl chloride-rubber coating substantially non-permeable to paint, and
    said first cover member is configured to overlap with a second cover member;
    wherein the second cover member includes a second primary groove, and a second secondary groove situated within the second primary groove, wherein the second primary and secondary grooves are configured to register with a second door jamb of said door, wherein said second secondary groove is substantially centrally situated within the second primary groove and shaped so as to register with a second protrusion of said second door jamb.

20. A flexible floor cover that is capable of being folded-up and usable for protecting a surface that is not intended to be painted during painting, comprising:
    a first cover member including a first primary groove, wherein the first primary groove is configured to register with a first door jamb of a door, said first primary groove having a first secondary groove situated off-center within said first primary groove and shaped so as to register with a first protrusion of said first door jamb wherein:
    said first cover member further comprises a material based on a polyvinyl chloride-rubber coating substantially non-permeable to paint, and
    said first cover member is configured to overlap with a second cover member;
    wherein the second cover member includes a second primary groove, and a second secondary groove situated within the second primary groove, wherein the second primary and secondary grooves are configured to register with a second door jamb of said door, wherein said second secondary groove is situated off-center within said second primary groove and shaped so as to register with a second protrusion of said second door jamb.

21. A combination including a flexible floor cover that is capable of being folded-up and usable for protecting a surface that is not intended to be painted during painting, comprising:
    a first door jamb including a protrusion;
    a door coupled to the first door jamb;

a second door jamb including a door stop;

a first cover member including a first primary groove, and a first secondary groove situated within the first primary groove, wherein the first primary groove is registered with the first door jamb and the first secondary groove is registered with the protrusion of the first door jamb;

a second cover member including a second primary groove, and a second secondary groove situated within the second primary groove, wherein the second primary groove is registered with the second door jamb, and the second secondary groove is registered with the door stop of the second door jamb.

22. The combination of claim 21, wherein the first and second cover members each contain a length and a width to create a form that is substantially rectangular in shape.

23. The combination of claim 22, wherein the first and second primary grooves are located along the lengths of the first and second cover members, respectively.

24. The combination of claim 23, wherein the first and second primary grooves are positioned off-center along the lengths of the first and second cover members, respectively.

25. The combination of claim 24, wherein the first and second cover members each contain a first sub-length and a second sub-length;

wherein, the first sub-length begins at an end of the corresponding length and ends at a center position of the corresponding primary groove;

wherein, the second sub-length begins at the center position of the corresponding primary groove and ends at an opposite end of the corresponding length; and wherein the second sub-length of each the first and second cover members substantially underlie a full door swing area of the door.

26. The combination of claim 25:

wherein the width of the first cover member extends from the first door jamb partially across a distance to the second door jamb; and wherein the width of the second cover member extends from the second door jamb partially across a distance to the first door jamb.

27. The combination of claim 26, wherein the first and second cover members overlap with each other.

* * * * *